Sept. 11, 1956 D. P. DELMAS 2,762,442
PARKING APPARATUS FOR AUTOMOTIVE VEHICLE
Filed Dec. 5, 1952 3 Sheets-Sheet 1

INVENTOR
*Donald P. Delmas*

BY
*McMorrow, Berman + Davidson*
ATTORNEYS

Sept. 11, 1956
D. P. DELMAS
2,762,442
PARKING APPARATUS FOR AUTOMOTIVE VEHICLE
Filed Dec. 5, 1952
3 Sheets-Sheet 2
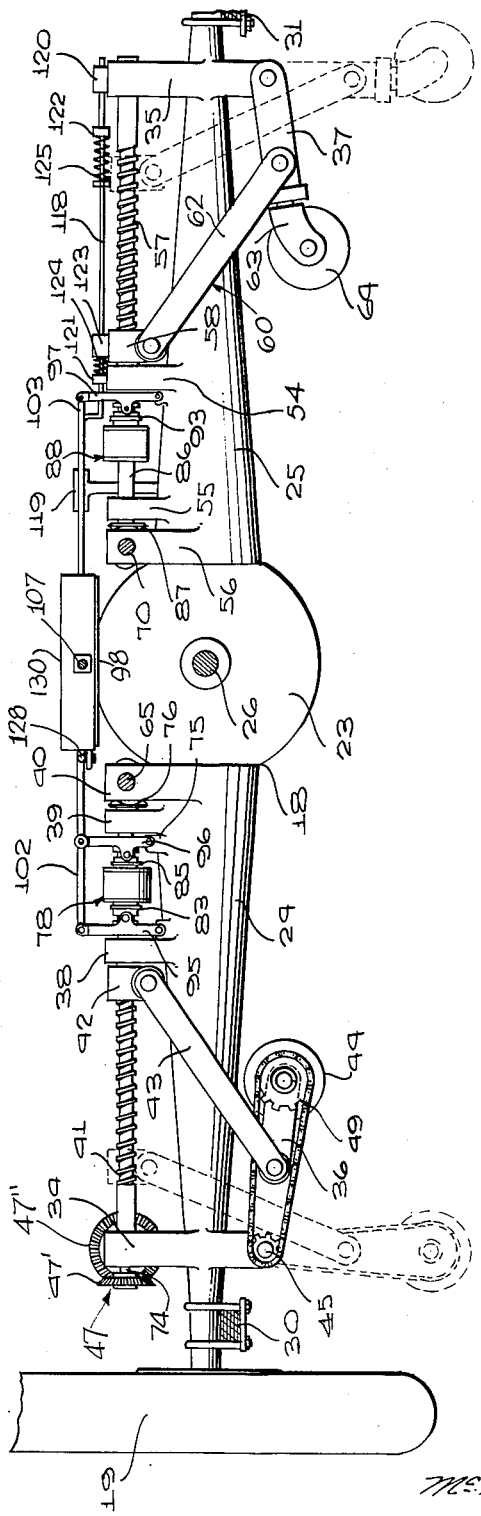
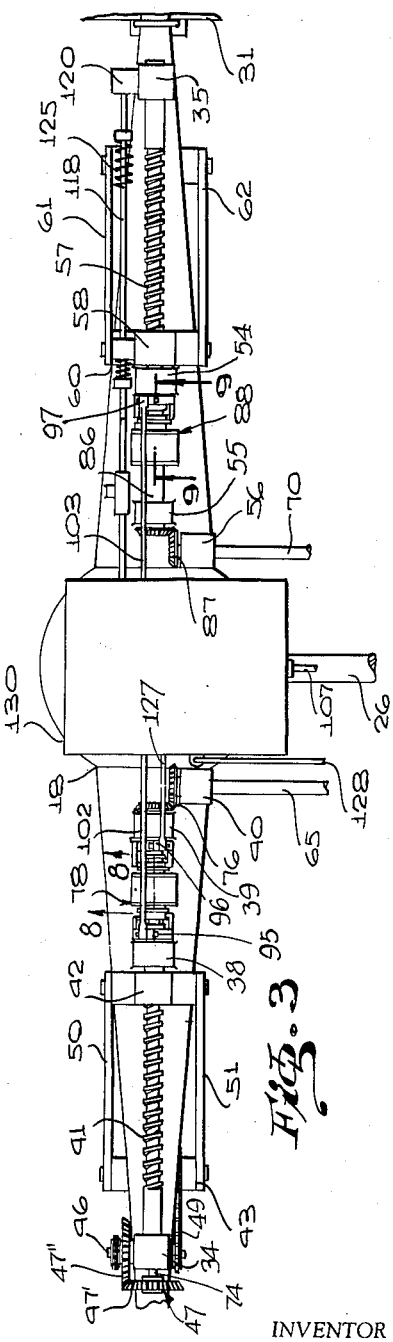
Fig. 2
Fig. 3
INVENTOR
Donald P. Delmas
BY
McMorrow, Berman + Davidson
ATTORNEYS

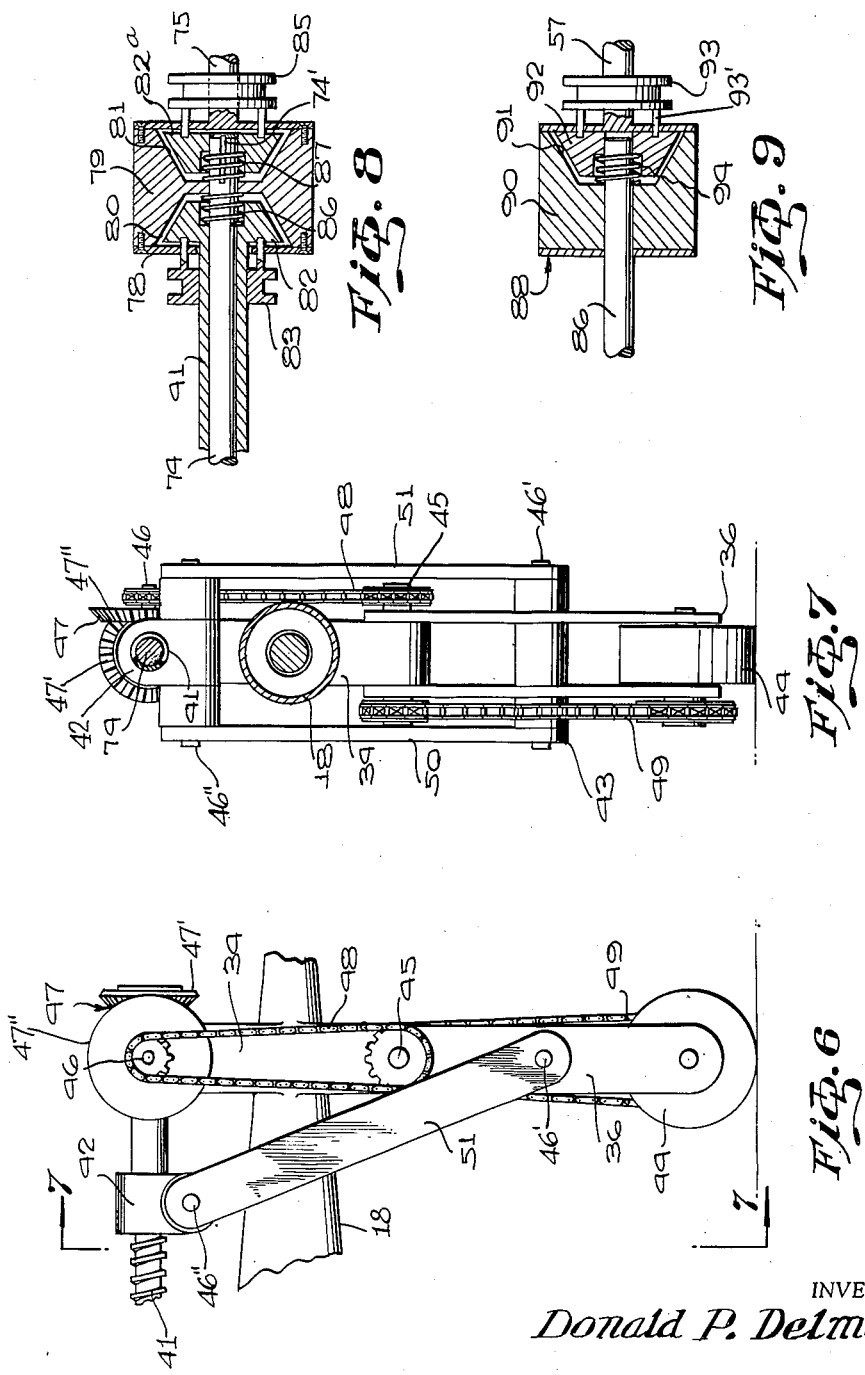

United States Patent Office 2,762,442
Patented Sept. 11, 1956

2,762,442

PARKING APPARATUS FOR AUTOMOTIVE VEHICLE

Donald P. Delmas, Oakland, Calif.

Application December 5, 1952, Serial No. 324,343

3 Claims. (Cl. 180—1)

This invention relates to parking apparatus for an automotive vehicle and more particularly to parking apparatus mounted on and driven by the vehicle for moving the rear end of the vehicle laterally into and out of a parking space.

It is among the objects of the invention to provide an improved parking apparatus or mechanism which can be mounted on an existing vehicle with no material modification of the vehicle construction, or easily incorporated as a part of a new vehicle, and driven by the vehicle power plant to facilitate moving the vehicle into or out of a parking space; which can be operated by vehicle power under manual control to raise and lower the rear end of an automotive vehicle and move the vehicle rear end laterally into or out of a parking space; which automatically discontinues the application of power thereto when the vehicle rear end has been fully raised or lowered; which may be utilized to raise the vehicle rear wheels for changing tires, applying skid chains or other purposes; and which is simple and durable in construction, economical to manufacture, easy to use, and positive and effective in operation.

Other objects and advantages will become apparent from a consideration of the following description and the appended claims in conjunction with the accompanying drawings wherein:

Figure 2 is a cross sectional view on an enlarged scale on the line 2—2 of Figure 1;

Figure 3 is a top plan view of the mechanism illustrated in Figure 2;

Figure 4 is a top plan view of the differential unit of Figure 3, with the cover removed and with parts broken away;

Figure 5 is a transverse cross sectional view on the line 5—5 of Figure 4;

Figure 6 is a fragmentary cross sectional view on an enlarged scale on the line 6—6 of Figure 1;

Figure 7 is a cross sectional view on the line 7—7 of Figure 6;

Figure 8 is a fragmentary cross sectional view on an enlarged scale on the line 8—8 of Figure 3; and Figure 9 is a fragmentary cross sectional view on an enlarged scale on the line 9—9 of Figure 3.

Figure 1:
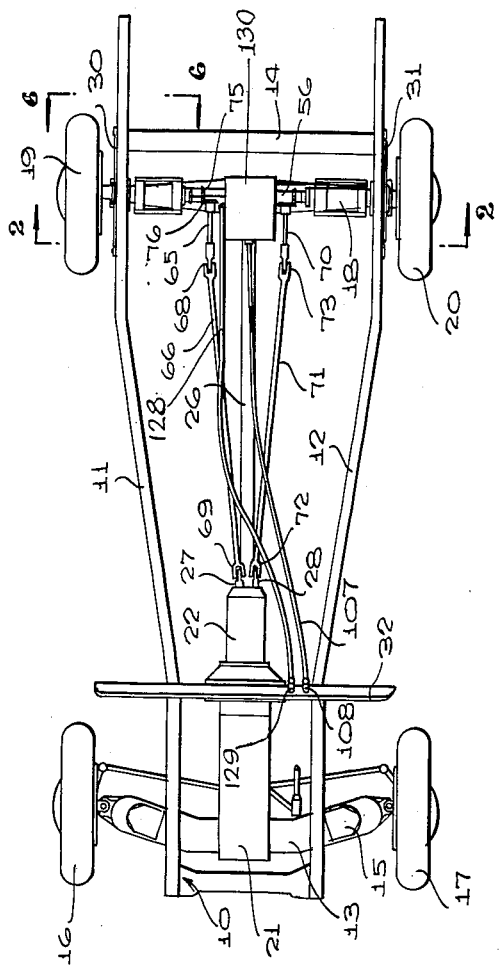
Figure 1 is a top plan view of a vehicle chassis with parking apparatus illustrative of the invention operatively mounted thereon.

With continued reference to the drawings, the vehicle chassis illustrated in Figure 1 is of well known construction and includes a frame, generally indicated at 10, having side rails or members 11 and 12 and cross members, as indicated at 13 and 14, rigidly holding the side members in position relative to each other, a front axle 15, or equivalent front wheel suspension mechanism, disposed below the frame near the front end of the frame and carrying the front wheels 16 and 17, one at each side of the frame, and a rear axle assembly 18 disposed below the frame near the rear end of the frame and carrying the rear drive wheels 19 and 20 one at each end of the rear axle and outwardly of the respectively opposite sides of the frame 10. An engine 21 is mounted on the front portion of the frame 10 and a transmission mechanism 22 is mounted on the rear end of the engine. The rear axle assembly 18 includes a centrally disposed differential unit or mechanism 23, axle housings 24 and 25 extending outwardly from respectively opposite sides of the differential unit 23 in longitudinal alignment with each other, and axle shafts, not illustrated, extending through the housings 24 and 25 respectively, from the differential mechanism 23 to the corresponding rear wheels 19 and 20 to drivingly connect the differential mechanism to the rear wheels. A drive shaft 26 extends from the transmission unit 22 to the differential unit 23 and drivingly connects the transmission unit to the differential unit. The transmission unit has, near its rear end, a gear, not illustrated, which is driven in one direction when the transmission unit is in forward drive and is driven in the opposite direction when the transmission unit is in reverse drive, and stub shafts 27 and 28 project from the rear end of the transmission unit 22 at locations spaced from the drive shaft 26 and are drivenly connected to the transmission gear, so that these stub shafts are also driven in one direction when the transmission unit is in a forward drive condition and are driven in the opposite direction when the transmission unit is in a reverse drive condition.

The vehicle frame 10 is mounted on the front axle 15 and the rear axle assembly 18 by springs, as indicated at 30 and 31 for the rear axle, of a construction well known to the art, and an instrument panel 32 extends transversely of the frame and is supported above the rear portion of the vehicle engine 21.

The parking apparatus of the present invention is mounted on the rear axle assembly 18 of the vehicle and driven from the vehicle transmission 22 and includes brackets 34 and 35 mounted on the rear axle housing, one near each end of the rear axle and extending above and below the housing, a strut 36 pivotally connected at one end to the lower end of the bracket 34 for movement about a horizontal axis substantially perpendicular to a plane including the longitudinal center line of the rear axle housing between a position in which it is disposed closely adjacent the under side of the axle housing and extends from the rear end of the bracket 34 toward the differential 23, as shown in full lines in Figure 2, and a position in which it extends substantially vertically downwardly from the lower end of the bracket 34, as illustrated in broken lines in Figure 2, and a strut 37 pivotally connected at one end to the lower end of the bracket 35 for movement about a substantially horizontal axis disposed substantially perpendicular to a plane including the longitudinal center line of the rear axle housing between a position adjacent the under side of the rear axle, as shown in full lines in Figure 2, and a position in which it extends downwardly from the lower end of the bracket 35 and is substantially vertically disposed.

Bearing blocks 38, 39 and 40 are mounted on the upper side of the rear axle housing 24 between the differential unit 23 and the end of the rear axle carrying the rear wheel 19 with the block 40 contiguous to the differential unit, the block 39 slightly spaced from the side of the block 40 remote from the differential unit and the block 38 disposed between the bearing block 39 and the bracket 34 and spaced from the block 39. A screw shaft 41 is journaled at one end in the upper portion of the bracket 34 and at its other end in the bearing block 38 and is disposed above and substantially parallel to the longitudinal center line of the rear axle 18. A nut 42 is threaded onto the shaft 41 and movable along the shaft between the bracket 34 and the bearing block 38 upon rotation of the shaft, and this nut is connected by a pivoted link assembly 43 to the strut 36 at a location on the strut spaced from the pivotal connection between the strut and the bracket 34.

A roller 44 is mounted on the strut 36 at the end of this strut remote from the bracket 34 for rotation about an axis substantially parallel to the axis of pivotal connection between the strut 36 and the bracket 34 and means are provided for rotationally driving this roller about its axis of rotation relative to the strut 36. This means includes a shaft 45 constituting the pivotal connection beween the strut 36 and bracket 34, a shaft 46 journaled in the upper portion of the bracket 34 with its rotational axis substantially perpendicular to the rotational axis of the screw shaft 41, a beveled gear drive 47 carried by the shaft 46, a chain drive 48 between the shaft 46 and the shaft 45, and a chain drive 49 between the shaft 45 and the roller 44.

The link assembly 43 comprises two link members 50 and 51 disposed at respectively opposite sides of the corresponding end portion of the axle 18, the strut 36 carries a pin 46' to which is pivotally connected the one of the adjacent ends of the members 50 and 51, the other of the adjacent ends of said members 50 and 51 being pivotally connected to a pin 46" carried by the nut 42 which is in threaded engagement with the shaft 41. Bearing blocks 54, 55 and 56 corresponding to the bearing blocks 38, 39 and 40 are mounted on the upper side of the axle housing 25 at the side of the differential 23 opposite the bearing blocks 38, 39 and 40, and a screw shaft 57 is journaled at one end in the bearing block 54 and at its other end in the upper portion of the bracket 35 with its center line above and substantially parallel to the longitudinal center line of the axle assembly 18. A nut 58 is threaded onto the screw shaft 57 and movable along this shaft upon rotation of the shaft and a linkage assembly 60 including link members 61 and 62 spaced at respectively opposite sides of the corresponding end portion of the axle 18 pivotally connects the nut 58 to the strut 37 at a location along the strut 37 spaced from the pivotal connection between this strut and the lower end of the bracket 35. A roller or caster fork 63 is mounted on the strut 37 at the end of the strut remote from the bracket 35 for rotational movements about an axis substantially coincident with or parallel to the longitudinal center line of the strut and a roller 64 is journaled in the fork 63 for rotation about an axis substantially perpendicular to the rotational axis of the fork 63 relative to the strut 37.

With the arrangement so far described, when the screw shafts 41 and 57 are rotated in a direction to move the corresponding nuts 42 and 58 from positions adjacent the bearing blocks 38 and 54 to positions adjacent the brackets 34 and 35, the struts 36 and 37 will be swung downwardly about their pivotal connections with the lower ends of the corresponding brackets 34 and 35, bringing the rollers 44 and 64 into engagement with the ground and raising the rear axle assembly 18 to a position at which the rear wheels 19 and 20 are supported above the ground.

A shaft 70 is journaled in the bearing block 56 with its rotational axis substantially perpendicular to the rotational axis of the screw shaft 57 and a connecting shaft 71 extends between the stub shaft 28 and the shaft 70 and is connected at its opposite ends to the stub shaft and the shaft 70 by universal joint conections 72 and 73 respectively.

The screw shaft 41 is tubular, as illustrated in Figure 8, and an inner shaft 74 extends through the tubular screw shaft 41 and is connected to bevel gear 47' of the gear drive 47 through which the roller 44 is driven, the other bevel gear 47" of the gear drive 47 being carried by the shaft 46. A shaft 75 is journaled in the bearing block 39 with its rotational axis substantially coincident with the common rotational axis of the screw shaft 41 and inner shaft 74 and a beveled gear drive 76 connects the shaft 65 to the shaft 75. The connecting shaft 66 extends between the stub shaft 27 and the shaft 65 and is connected at its opposite ends to the stub shaft 27 and shaft 65 by universal joint connections 69 and 68 respectively.

A double cone clutch, generally indicated at 78, is disposed between the bearing brackets 38 and 39 and, as illustrated in Figure 8, has its outer portion 79 drivenly connected directly to the shaft 75 by means of the flange 75' fixed to the shaft 75, the clutch 78 being provided with oppositely disposed cone receiving recesses 80 and 81. A cone 82 on the outer shaft 41 is disposed in the recess 80 and moved into and out of engagement with the outer clutch element 79 by an annular clutch operating collar 83 surrounding the screw shaft 41 adjacent the clutch 78, and a clutch cone 82a is disposed in the recess 81 and slidably connected to the shaft 74 by means of the cooperating spline 74' on the cone 82a and the shaft 74. This clutch cone 82a is moved into and out of engagement with the clutch element 79 by a clutch collar 85 surrounding the shaft 75 adjacent the clutch 78. The cone 82 drivingly connected to the screw shaft 41 and the cone 82a slidably supported on to the inner shaft 74 are resiliently urged out of engagement with the recessed clutch element 79 by suitable means, such as the springs 86 and 87.

A shaft 86 is journaled in the bearing block 55, and the shaft 70 is drivingly connected to this shaft 86 by a beveled gear drive 87.

A clutch 88 is disposed between the bearing blocks 54 and 55 and includes an outer clutch element 90 carried by the shaft 86 by being press fitted on the latter named shaft and having in one end a conical recess 91. A cone element 92 is received in the conical recess 91 and is slidably supported on the shaft 86, the cone element 92 being drivingly connected to the shaft 57 by means of pins 93' carried by a clutch collar 93 on the shaft 57 and extending into holes provided in the cone element 92. The cone element is resiliently urged out of engagement with the outer clutch element by suitable means, such as the spring 94.

Clutch operating levers 95 and 96 are pivotally mounted on the axle at the respectively opposite ends of the clutch 78 and are connected to the clutch operating collars 83 and 85 respectively. A clutch operating lever 97 is pivotally mounted on the axle between the bearing block 54 and the clutch 88 and operatively connected to the clutch collar 93, these levers being effective to engage and disengage the clutches 78 and 88.

A base plate 98 is mounted on the top of the differential unit 23 and oppositely disposed bell crank levers 100 and 101 are pivotally mounted intermediate their length on this base plate. The lever 100 is connected at one end to the clutch lever 95 at the end of this clutch lever remote from the axle by a link 102 and the bell crank lever 101 is connected at one end to the clutch lever 97 at the end of this clutch lever remote from the axle by a link 103. The bell crank levers 100 and 101 are longitudinally slotted at their opposite ends and receive an actuating pin 104. A bar 105 is slidably mounted in guides 106 and 107 on the base plate 98 and carries the actuating pin 104 for moving the bell crank levers 100 and 101 about their pivotal connections 100' and 101' with the plate 98 upon longitudinal movement of the bar 105 relative to the base plate. At its end adjacent the front side of the differential unit the bar 105 is connected by a flexible push and pull element 107 with a manually operated control lever 108 mounted on the instrument panel 32 of the vehicle. When the operator of the vehicle moves the lever 108 in one direction it moves the bar to a position at which the clutch cones 82 and 92 are engaged with the corresponding outer clutch elements 79 and 90 through the intermediacy of the bell crank levers 100 and 101 and the links 102 and 103, and when the operator moves the lever 108 in the opposite direction these clutch cones are moved out of engagement with the corresponding outer clutch elements. The bar 105 is releasably held in either its clutch engaging or its clutch disengaging position by suitable means, such as the spring toggle members 110 and 111 disposed at respectively opposite sides of the bar and each pivotally connected at one end to the plate 98 and at its other end to the bar 105.

A slide member 112 is slidably mounted on the plate 98 by the guides 113 and 114 secured to the plate and slidably receiving the slide member, and this slide member extends transversely across the bar 105 substantially perpendicular to this bar. A detent 115 is provided on the bar 105 and a complementary detent 116 is provided on the slide member 112 and engageable with the detent 115, the detents both having inclined side edges, so that movement of the detent 116 past the detent 115 will impart a longitudinal movement to the bar 105. A rod 118 is conected at one end to the slide member 112 at one end of the latter and extends longitudinally of the screw shaft 57 above and substantially parallel to this screw shaft. This rod is slidably supported in guide lugs 119 and 120 mounted on the bearing block 55 and the bracket 35 respectively, and carries spring abutments 121 and 122 at spaced apart locations therealong. An apertured lug formation 123 on the nut 58 slidably receives the rod 118 between the spring abutments 121 and 122 and a compression spring 124 is disposed between the abutment 121 and the lug formation 123, while a similar compression spring 125 is disposed between the lug formation 123 and the spring abutment 122.

With this arrangement, when the nut 58 has been moved to its position nearest the differential unit 23 fully retracting the strut 37, as illustrated in full lines in Figure 2, the lug formation 123 compresses the spring 124 and forces the rod 118 longitudinally in a direction to move the detent 116 past the detent 115 and thereby move the bar 105 to its clutch disengaging position, the detent 116 being carried past the detent 115 by the expansion of the compressed spring 124 after the bar 105 has been moved to its clutch disengaging position, as explained above. If now the operator moves the clutch control lever 108 to move the bar 105 to its clutch engaging position, the nuts 42 and 58 will be threaded outwardly along the corresponding screw shafts 41 and 57, moving the struts 36 and 37 to their fully extended positions, as illustrated in broken lines in Figure 2, and when the nut 58 reaches a position on the screw shaft 57 at which the strut 38 is fully extended, the lug formation 123 strikes and compresses the spring 125, imparting longitudinal movement to the rod 118 and moving the detent 116 back past the detent 115, thereby returning the bar 105 to its clutch disengaging position. The detent 116 is moved past the detent 115 by the expansion of the compressed spring 125 after the clutch operating bar 105 has been moved to its clutch disengaging position and the bar 105 is releasably held in its clutch engaging or clutch disengaging position by the spring toggle structures 110 and 111, as explained above.

A third bell crank lever 126 is pivotally mounted intermediate its length on the base plate 98 as at 126' and has one end connected to the clutch lever 96 at the end of this clutch lever remote from the axle 18 by a link 127. The other end of the bell crank lever 126 is connected by a flexible push and pull element 128 to a second clutch lever 129 mounted on the instrument panel 32.

After the screw shafts have been driven to fully extend the struts 36 and 37, as explained above, and the screw shaft driving clutches have been disengaged, the operator may move the lever 129 to engage the clutch cone 82a with the outer clutch element 79, thereby driving the inner shaft 74 which, through the intermediacy of the beveled gear drive 47 and chain drives 48 and 49 drives the roller 44 to move the rear end of the associated vehicle into or out of a parking space.

The rotational direction of the screw shafts 41 and 57 and the rotational direction of the inner shaft 74 are controlled by controlling the vehicle transmission 22 for either a low speed forward drive or a reverse drive, the struts preferably being extended with the transmission in forward drive and retracted with the transmission in reverse drive, and the roller 44 driven to move the rear end of the vehicle into a parking space when the transmission is in forward drive, and out of the parking space when the transmission is in reverse drive.

The connecting shafts 65 and 70 will be driven whenever the vehicle is in low speed or reverse drive, but will not drive the screw shafts or the parking roller unless the corresponding clutches are engaged and these connecting shafts will not be driven when the vehicle transmission is in intermediate or high gear.

A cover 130 is mounted on the base plate 98 in covering relationship to the mechanism mounted on this base plate and together with the base plate constitutes a substantially closed housing for the associated mechanism.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination, an automotive vehicle having a differential mechanism including an axle housing, drive wheels mounted on opposite ends of the housing, a transmission mechanism connected to the differential mechanism, brackets fixed on the axle housing near said wheels, struts pivoted on the brackets to swing between elevated retracted positions to depressed extended positions, ground-engaging rollers on the struts, outer and inner bearings on the upper side of the housing inwardly of said brackets, outer screw shafts journaled in the brackets and in the outer bearings, inner shafts journaled in the inner bearings, said inner shafts being coaxial with said outer shafts, a clutch element on each of said inner shafts, a clutch element on each of said outer shafts for engaging the clutch element on the adjacent inner shaft, gear means on said axle housing and driving each inner shaft and connected to said transmission mechanism, nuts threaded on said outer screw shafts, and links pivoted at opposite ends to the nuts and to the struts.

2. In combination, an automotive vehicle having a differential mechanism including an axle housing, drive wheels mounted on opposite ends of the housing, a transmission mechanism connected to the differential mechanism, brackets fixed on the axle housing near said wheels, struts pivoted on the brackets to swing between elevated retracted positions to depressed extended positions, ground-engaging rollers on the struts, outer and inner bearings on the upper side of the housing inwardly of said brackets, outer screw shafts journaled in the brackets and in the outer bearings, inner shafts journaled in the inner bearings, said inner shafts being coaxial with said outer shafts, a clutch element on each of said inner shafts, a clutch element on each of said outer shafts for engaging the clutch element on the adjacent inner shaft, gear means on said axle housing and driving each inner shaft and connected to said transmission mechanism, nuts threaded on said outer screw shafts, and links pivoted at opposite ends to the nuts and to the struts.

3. In combination, an automotive vehicle having a differential mechanism including an axle housing, drive wheels mounted on opposite ends of the housing, a transmission mechanism connected to the differential mechanism, brackets fixed on the axle housing near said wheels, struts pivoted on the brackets to swing between elevated retracted positions to depressed extended positions, ground-engaging rollers on the struts, outer and inner bearings on the upper side of the housing inwardly of said brackets, outer screw shafts journaled in the brackets and in the outer bearings, inner shafts journaled in the inner bearings, said inner shafts being coaxial with said outer shafts, a clutch element on each of said inner shafts, a clutch element on each of said outer shafts for engaging the clutch element on the adjacent inner shaft, gear means on said axle housing and driving each inner shaft and connected to said transmission mechanism, nuts threaded on said outer screw shafts, and links pivoted at opposite ends to the nuts and to the struts, and articulated control means mounted on the axle housing and connected to the clutches and having a central member reaching away from the housing.

References Cited in the file of this patent

UNITED STATES PATENTS

| | | |
|---|---|---|
| 1,350,036 | Rapson | Aug. 17, 1920 |
| 1,761,554 | Wooley | June 3, 1930 |
| 1,764,486 | Wooley | June 17, 1930 |
| 1,896,118 | Wellensiek | Feb. 7, 1933 |
| 1,920,216 | Ramondetta | Aug. 1, 1933 |
| 1,940,724 | Mizzy et al. | Dec. 26, 1933 |

FOREIGN PATENTS

| | | |
|---|---|---|
| 470,887 | Germany | Feb. 1, 1929 |